Figure 1:
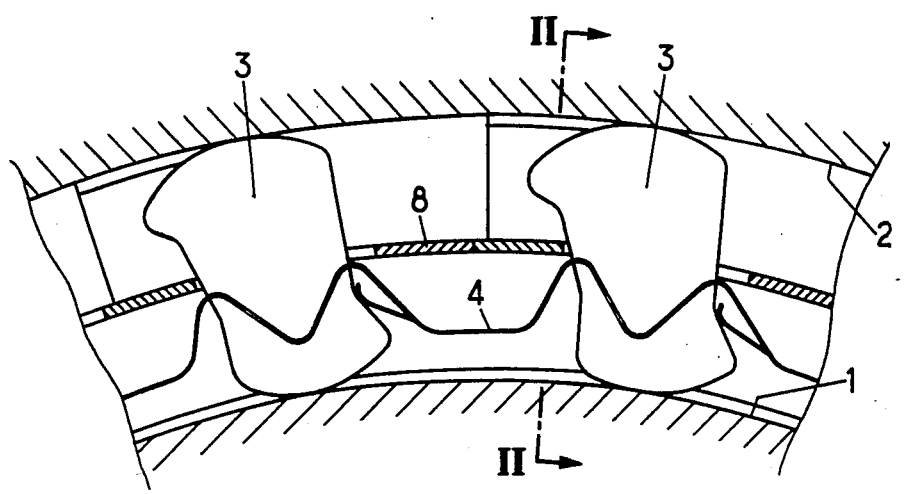
Figure 2:
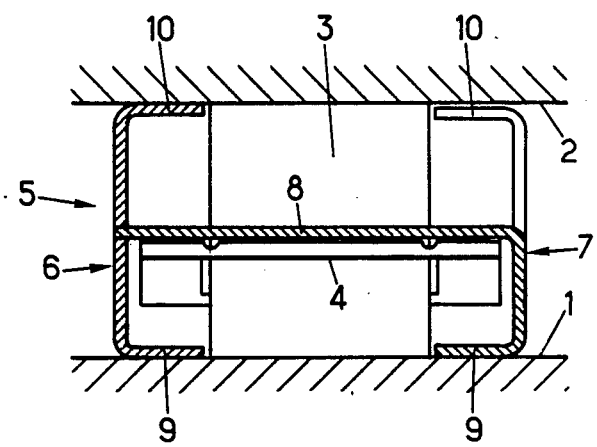
Figure 3:
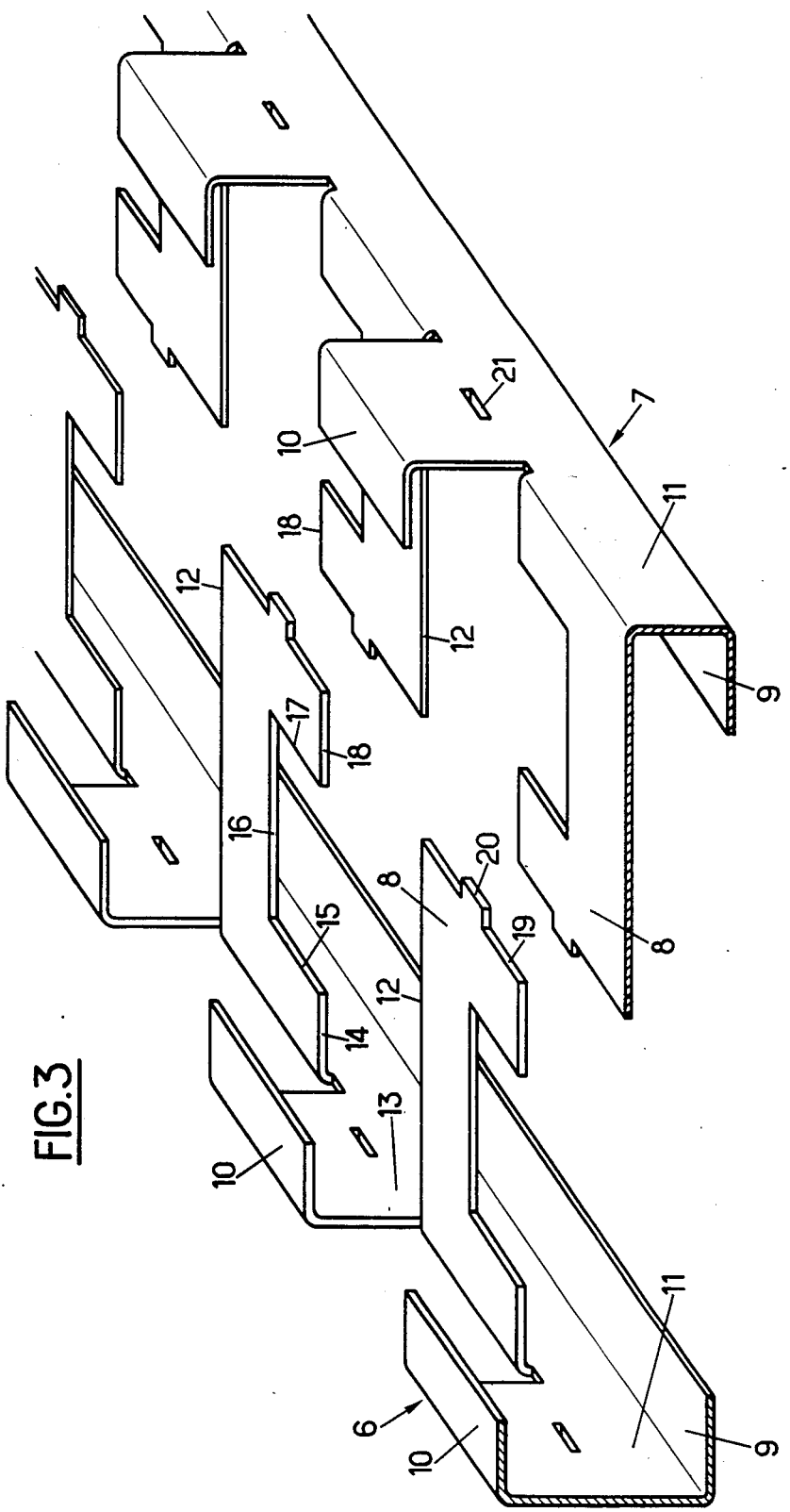

the first or driving rotary member (first and second driving members 120, 124) are aligned with each other with a high accuracy of concentricity, so that the driven and driving members are rotatably supported. The yoke 134 is a thick-walled annular member made of a magnetic material which has a radially outer friction surface (first friction surface) 138 and a radially inner friction surface (second friction surface) 140. The outer friction surface 138 is opposite to the radially inner friction surface 118 of the first driving member 120 such that these surfaces 118 and 138 cooperate to define a first powder gap 162. In the meantime, the inner friction surface 140 is opposite to the radially outer friction surface 122 of the second driving member 124 such that these friction surfaces 140 and 122 cooperate to define a second powder gap 163. A member 145 carrying slip rings 144, 144 is fixed to the positioning member 136 with bolts 142. The positioning member 136 is connected via a damper 146 to a crank hub 148 which fits on the output shaft 112 by means of a spline. A solenoid coil 150 of a substantially rhombic cross sectional shape is embedded in the yoke 134. When a current is applied to the solenoid coil 150 through the slip rings 144, particles of the powder masses 128 are magnetized, and the first and second powder gaps 162 and 163 are filled with the powder masses 128 in the form of tightly coherent bodies. Thus, the first and second driving members 120, 124 are connected to the yoke 134 by means of the coherent powder masses 128 in the respective powder gaps 162, 163. As described in connection with the first embodiment, the powder masses 128 are enclosed in the powder gaps 162, 163 by various labyrinth members 152, which are attached to the first driving member 120, yoke 134, positioning member 136 and second driving member 124.

The yoke 134 is dimensioned so that an area S1 of the radially outer friction surface 138 (first outer friction surface) is substantially or almost equal to an area S2 of the radially outer friction surface 122 (second outer friction surface) of the second driving member 124. Described in greater detail, the areas S1 and S2 of the friction surfaces 138 and 122 are expressed by the following equations (1) and (2), respectively:

$$S1 = \pi \cdot D1 \cdot L1 \qquad (1)$$

$$S2 = \pi \cdot D2 \cdot L2 \qquad (2)$$

where,
L1: axial width of the surface 138
L2: axial width of the surface 122
D1: diameter of the surface 138
D2: diameter of the surface 122

Accordingly, the areas S1 and S2 of the friction surfaces 138 and 122 are determined so as to satisfy the following equation (3):

$$D1 \cdot L1 \approx D2 \cdot L2 \qquad (3)$$

Figure 4:
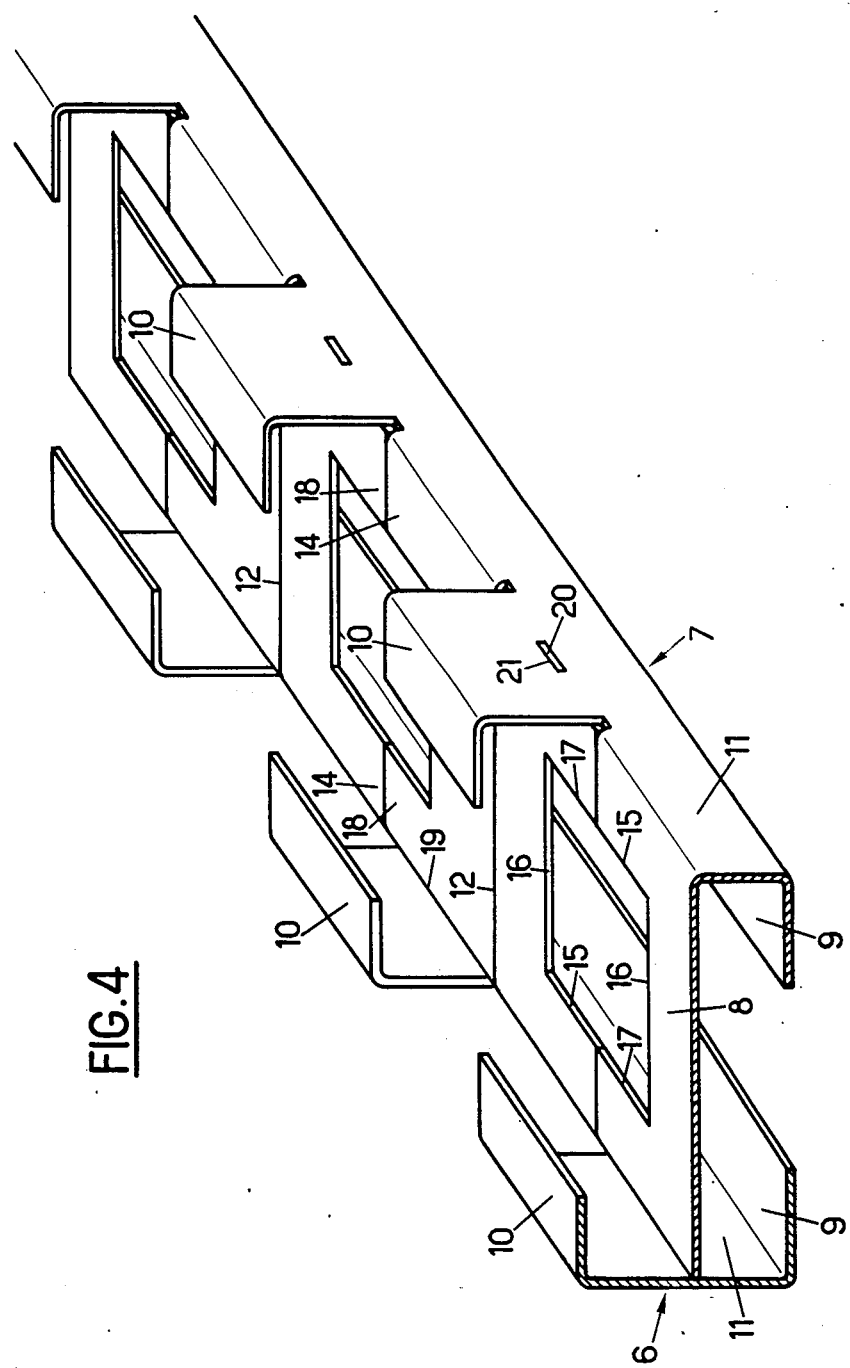

As shown in FIG. 4, the radially outer friction surface 138 of the yoke 134 and the radially outer friction surface 122 of the second driving member 124 are formed with circumferential grooves 164 for improving the torque transmission characteristics of the clutch, and with central circumferential recesses 166 for separating magnetic paths of opposite directions. In this connection, it is noted that the axial widths L1 and L2 do not include widths of the grooves 164 and recesses 166. More specifically, a portion of the axial width L1 of the friction surface 138 that does not actually serve to provide a friction surface is expressed as $$\sum_{k=1}^{n} l_k,$$

and a portion of the axial width L2 of the friction surface 122 that does not actually serve to provide a friction surface is expressed as $$\sum_{k=1}^{n'} l_k',$$

where the widths of the grooves 164 and the recesses 166 are l1 through ln, respectively. Therefore, the substantive axial widths L1 and L2 of the friction surfaces 138, 122 are obtained from the following equations (4) and (5):

$$L1 = L_{10} - \sum_{k=1}^{n} l_k \qquad (4)$$

$$L2 = L_{20} - \sum_{k=1}^{n'} l_k' \qquad (5)$$

where,
$L_{10}$: nominal width of the surface 138 (in FIG. 4)
$L_{20}$: nominal width of the surface 122 (in FIG. 4)

Figure 5:
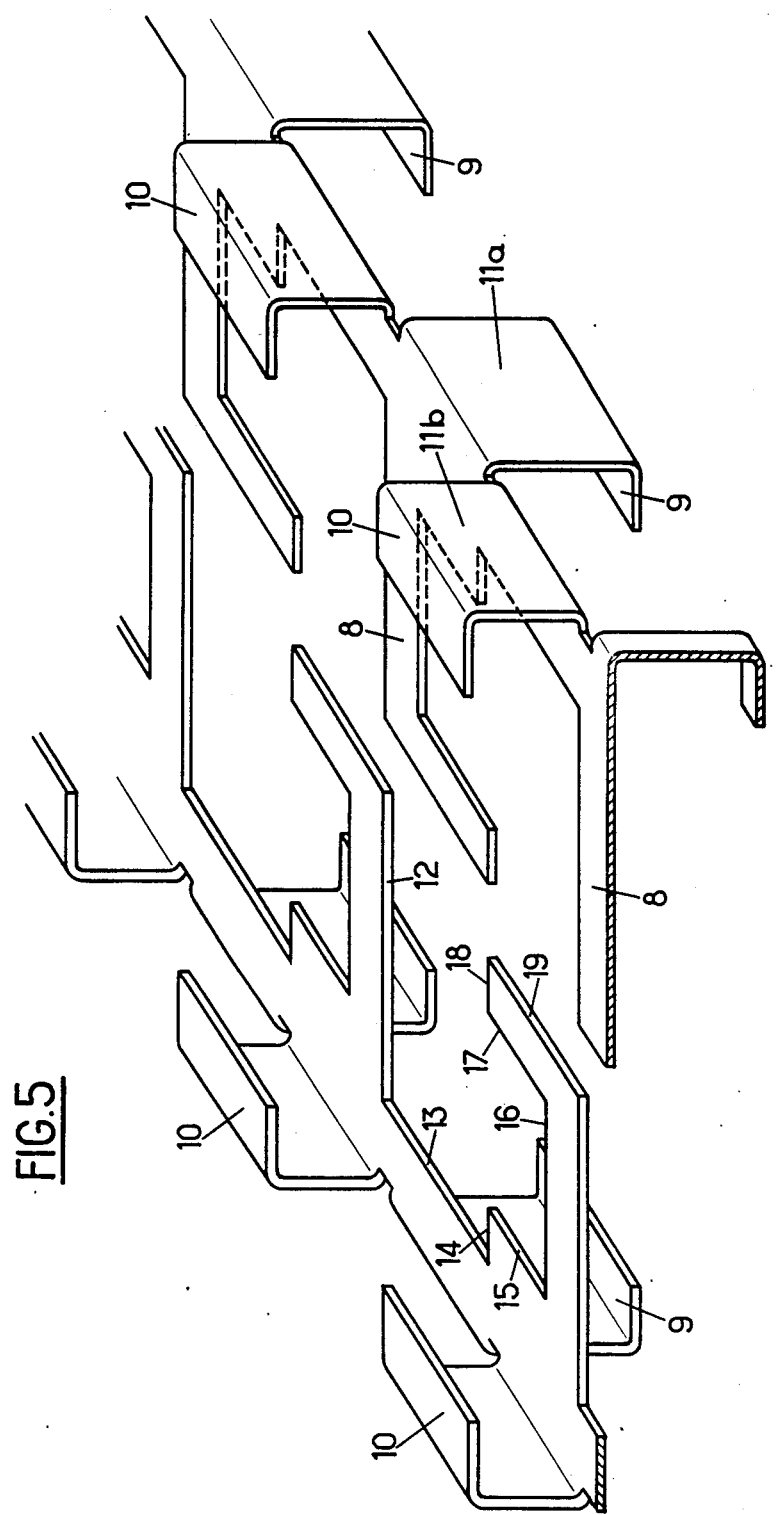

In a conventional electromagnetic powder clutch of two-gap type, outer and inner friction surfaces corresponding to the friction surfaces 138, 122 have substantially the same axial width ($L1 = L2$). Suppose the diameters of these outer and inner friction surfaces are 1: 2 ($D1 = 2 \cdot D2$), S1/S2 is equal to 2 ($S1/S2 = 2$). If, for example, a magnetic flux density B ($\Phi/S$) on the inner friction surface (122) is an upper limit 1.0 (wb/m$^2$) of a nominal range of FIG. 5, a magnetic flux density on the outer friction surface (138) is 0.5 (wb/m$^2$), where $\Phi$ is a magnetic flux (wb). In this instance, tangential forces f1 and f2 per unit area on the outer and inner friction surfaces (138, 122) are obtained from the relation of FIG. 5, as $f1 = 0.4 \times 10^4$ (kg/m$^2$), and $f2 = 1.4 \times 10^4$ (kg/m$^2$), respectively. Torques T1 and T2 transmitted by the outer and inner friction surfaces (138, 122) are expressed by the following equations (6) and (7):

$$T1 = (\pi/2) \cdot f1 \cdot D1^2 \cdot L1 \qquad (6)$$

$$T2 = (\pi/2) \cdot f2 \cdot D2^2 \cdot L2 \qquad (7)$$

From the above equations, a total torque T (T1+T2) transmitted by the clutch is obtained as follows:

$$T = \pi \cdot L2 \cdot D2^2 (2f1 + \tfrac{1}{2} f2) \qquad (8)$$
$$= 1.5 \pi \cdot L2 \cdot D2^2 \times 10^4 \text{ (kg/m}^2\text{)}$$

In the instant embodiment wherein $S1 \approx S2$, however, the axial width $L1 = \tfrac{1}{2} L2$ when $D1 = 2 \cdot D2$. Hence, torques T1 and T2 transmitted by the friction surfaces 138 and 122, and a total torque T of the clutch, are calculated according to the following equations (9), (10) and (11), respectively $$T1 = (\pi/2) \cdot f2 \cdot D1^2 \cdot \tfrac{1}{2} L2 \qquad (9)$$

$$T2 = (\pi/2) \cdot f2 \cdot D2^2 \cdot L2 \qquad (10)$$

The equation (18) is converted into the following equation (18):

$$B = \mu \cdot (n \cdot I)/l \ (\text{wb/m}^2) \quad (18)$$

where,
 μ: magnetic permeability
 n: number of windings of coil
 I: energization current
 l: length of magnetic circuit Suppose the coil winding number n and the length l of the magnetic circuit are constant, the magnetic permeability μ or relative permeability $\mu_s$ is changed with a magnitude of the energization current I, as indicated in FIG. 7. Magnetic materials such as cast iron, cast steel and silicon steel are magnetically saturated as shown in FIG. 8. For example, carbon steel S10C (for machine structural use) according to Japanese Industrial Standard is magnetically saturated in the neighborhood of 1.6 wb/m². If the yoke 134 is magnetically saturated locally at a given portion, the transmission torque will not be increased by increasing the energization current I even when the other portion of the yoke 134 is magnetically unsaturated. That is, the maximum transmission torque is obtained when the yoke 134 is magnetically saturated at any local portion, and this saturated local portion is a bottleneck limiting the transmission torque of the clutch. FIG. 8 shows in cross section a typical conventional electromagnetic powder clutch of single-gap type, the construction of which is also applicable to a powder clutch of two- or double-gap type. In this conventional construction, portions A of a yoke 272 are highest in magnetic flux density, while portions B of the yoke 272 are lowest in magnetic flux density. Assuming the diameters at the portions A and B are $D_A$ and $D_B$, respectively, the circumferential areas $S_A$ and $S_B$ of the portions A and B (at their diameters $D_A$ and $D_B$) are obtained from the following equations (19) and (20), respectively:

$$S_A = \pi D_A \cdot L1 \quad (19)$$

$$S_B = \pi D_B \cdot L1 \quad (20)$$

where, L1: width of magnetic path (FIG. 9)

For example, where $D_A$ is 148 mm and $D_B$ is 191 mm, $S_A:S_B = 148:191 \approx 1:1.29$. As a ratio of magnetic flux densities at the portions A and B is a reciprocal of a ratio of their cross sectional areas, $B_A:B_B = 1:0.775 \approx 1.3:1$. That is, when the portions A are magnetically saturated, the portions B are 30% unsaturated, namely, the magnetic flux density at the portions B is 30% less than that at the portions A.

A moment of inertia R is expressed by the following equation (21):

$$R = (\pi/32) \cdot \delta \cdot Lw \cdot D^4 \quad (21)$$

where,
 δ: density of yoke 272
 Lw: axial width of yoke 272
 D: diameter of yoke 272

Figure 6:
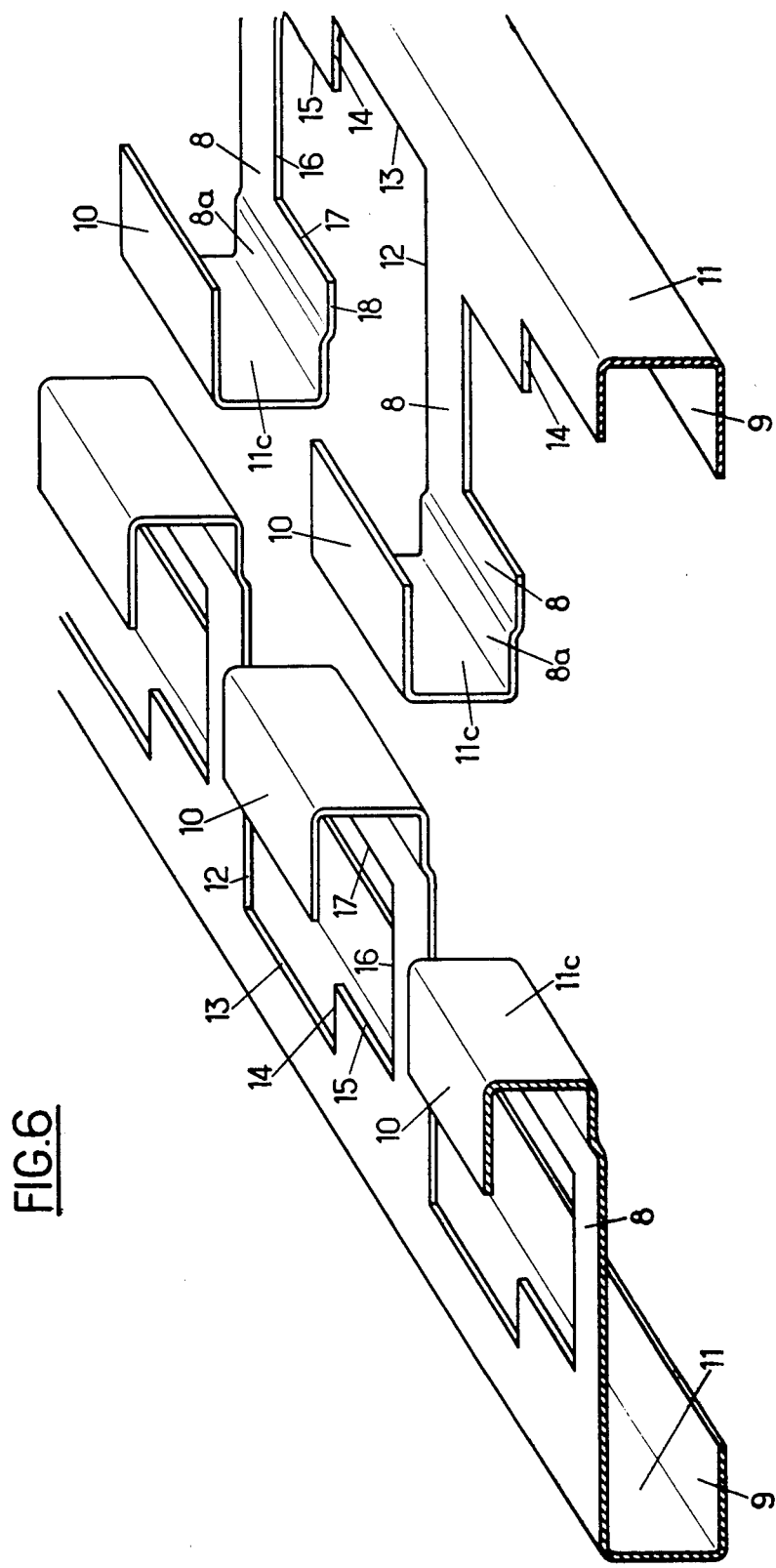

For comparing a moment of inertia R in the conventional arrangement of FIG. 9 with a moment of inertia Rk corresponding to that of the present embodiment of FIG. 6, portions C of the yoke 272 corresponding to the 30% surplus of the portions B are removed. The moment of inertia R before removal of the portions C, and the moment of inertia Rk after removal of the portions C are obtained from the following equations (22) and (23), where $D_A$ is 148 mm and $D_B$ is 191 mm:

$$R = \frac{\pi}{32} \cdot \delta \cdot L1 \, (D_B^4 - D_A^4) \quad (22)$$

$$Rk = \frac{\pi}{32} \cdot \delta \cdot L1 \left[ D_B^4 - \left( \frac{D_B + D_A}{2} \right)^4 \right] \times 0.7 + \quad (23)$$

$$\frac{\pi}{32} \cdot \delta \cdot L1 \left[ \left( \frac{D_B + D_A}{2} \right)^4 - D_A^4 \right]$$

Thus, $R:Rk \approx 1.22:1$. Therefore, the moment of inertia Rk is reduced by more than 20%, as compared with the moment of inertia R.

While the above explanation is based on the powder clutch of FIG. 9 of single-gap type, it is apppplicable to the powder clutch of FIG. 6 of double-gap type having the yoke 134. That is, the yoke 134 does not have an excessive weight at its radially outer portion or does not suffer an unnecessary increase in its moment of inertia, because the wall thickness of the first and second halves 254, 256 of the yoke 134 constituting a magnetic circuit is gradually reduced in the radially outward direction, as previously described.

As is apparent from the foregoing description, the powder clutch of FIG. 6 has a substantially constant cross sectional area of the magnetic flux paths in the yoke 134, in its radial direction, whereby the magnetic flux density is substantially constant at any positions of the yoke 134 in its radial direction. Accordingly, the weight and moment of inertia of the yoke 134 are minimized without reducing the maximum transmission torque of the clutch. When this electromagnetic powder clutch is used for an automotive vehicle, therefore, the fuel economy of the vehicle is increased owning to the reduced weight of the clutch, and the operating response of the clutch is improved thanks to the reduced moment of inertia of the yoke.

Although the solenoid coil 150 has a rhombic shape in cross section and the yoke 134 has an irregular hexagonal cross sectional shape, various changes and modifications may be made in the shape of the coil and yoke, including the provision of various suitable chambers or rounds at corners of the coil and yoke in cross section, as needed.

While the present invention has been described in its preferred embodiments with a certain degree of particularity, it is to be understood that the invention is not confined to the precise disclosure contained herein, but may be otherwise embodied, with various changes, modifications and improvements which may occur in those skilled in the art, without departing from the spirit and scope of the invention defined in the appended claims.

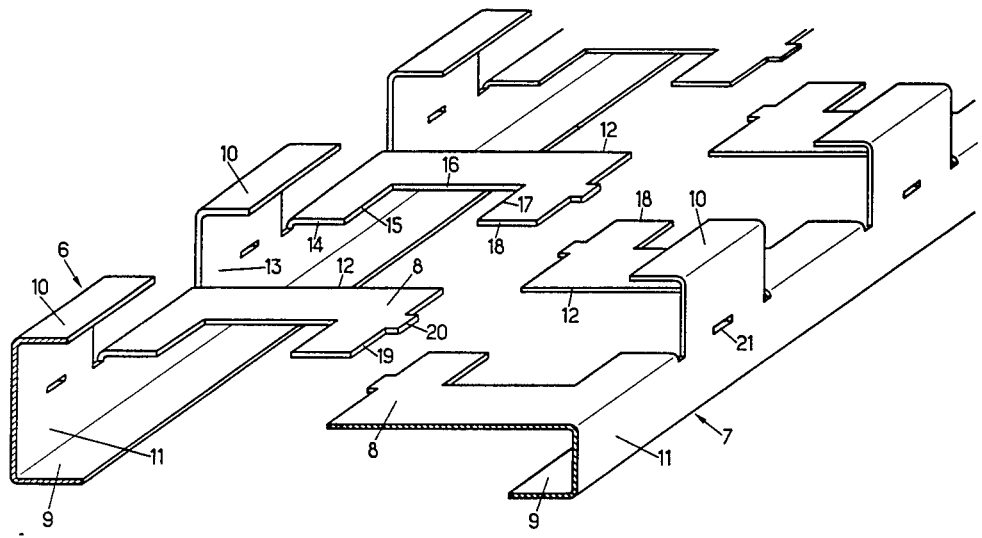

What is claimed is:

1. An electromagnetic powder clutch of double-gap type comprising:
 an annular driven rotary member incorporating therein a solenoid coil and having a portion which is made of a magnetic material and which surrounds said solenoid coil;
 a connecting member made of a non-magnetic material;

United States Patent [19]

Message

[11] Patent Number: 4,682,677
[45] Date of Patent: Jul. 28, 1987

[54] FREE WHEEL WITH SELF-CENTERING CAGE

[75] Inventor: Olivier Message, Antony, France

[73] Assignee: SKF Compagnie D'Applications Mecaniques, Clamart, France

[21] Appl. No.: 767,532

[22] Filed: Aug. 20, 1985

[30] Foreign Application Priority Data

Sep. 11, 1984 [FR] France ............................. 84 13926

[51] Int. Cl.$^4$ ............................................. F16D 41/07
[52] U.S. Cl. .................................. 192/41 A; 192/45.1
[58] Field of Search ...................... 192/41 A, 45.1, 45, 192/44, 43.2, 43.1, 43, 41 R

[56] References Cited

U.S. PATENT DOCUMENTS

| Re. 29,985 | 5/1979 | Brownhill et al. | |
|---|---|---|---|
| 2,912,086 | 11/1959 | Troendly et al. | |
| 3,104,744 | 9/1963 | Wade | 192/45 |
| 3,937,310 | 2/1976 | Oldfield | 192/41 A |
| 3,938,632 | 2/1976 | Geise et al. | 192/45.1 X |
| 3,952,849 | 4/1976 | Brownhill et al. | 192/41 A |

FOREIGN PATENT DOCUMENTS

| 1132390 | 3/1957 | Fed. Rep. of Germany | 192/45.1 |
|---|---|---|---|
| 1103088 | 3/1961 | Fed. Rep. of Germany | |
| 2403071 | 7/1975 | Fed. Rep. of Germany | |
| 1277845 | 10/1961 | France | |
| 2246772 | 6/1970 | France | |
| 2134913 | 11/1972 | France | |
| 2340476 | 9/1977 | France | |
| 2308013 | 8/1979 | France | |
| 2486606 | 7/1980 | France | |

Primary Examiner—Henry E. Raduazo
Assistant Examiner—Richard E. Chilcot
Attorney, Agent, or Firm—Beveridge, DeGrandi & Weilacher

[57] ABSTRACT

Free wheel, the cage (5) of which consists of two identical half cages (6, 7) each incorporating an intermediate cylindrical envelope (8) which is firmly fixed to portions forming surfaces (9, 10), which may or may not be continuous, for bearing against the surfaces of the shaft (1) and the bore (2), or the same side as, or on the side remote from the row of cams (3), the said intermediate envelope (8) incorporating notches (12 to 18) of such a shape that it allows the two half cages when positioned facing one another to be fitted together by an axial movement, enclosing the said spring between the central envelope (8) and the surface (9) for bearing upon the shaft, and leaving rectangular openings (15-17, 16, 15-17, 16) for cams (3) to be radially introduced, which thus lock axially the two half cages.

7 Claims, 6 Drawing Figures